United States Patent [19]
Buschman

[11] 3,909,943
[45] Oct. 7, 1975

[54] POWERED CUTTER WITH SNUBBER DRIVE MEANS

[75] Inventor: Jerome Buschman, Jefferson City, Mo.

[73] Assignee: McGraw-Edison Company, Elgin, Ill.

[22] Filed: Aug. 19, 1974

[21] Appl. No.: 498,412

[52] U.S. Cl. .............................. 30/216; 64/27 NM
[51] Int. Cl.² ..................... B26B 19/02; F16D 3/14
[58] Field of Search ............ 30/215, 216, 217, 218, 30/219, 220, 241; 64/27 NM

[56] References Cited
UNITED STATES PATENTS

| | | | |
|---|---|---|---|
| 2,870,616 | 1/1959 | Benson | 64/27 NM |
| 2,989,857 | 6/1961 | Helland | 64/27 NM |
| 3,036,445 | 5/1962 | Hein | 64/27 NM |
| 3,621,675 | 11/1971 | Conaghan | 64/27 NM |
| 3,802,222 | 4/1974 | Weber | 30/216 X |

Primary Examiner—Donald G. Kelly
Assistant Examiner—J. C. Peters
Attorney, Agent, or Firm—Charles F. Lind

[57] ABSTRACT

A snubber device in the drive between a motor output and the powered cutting blade of a cutting tool, where the snubber device includes a pair of adjacent plates each independently supported to rotate about a common axis but further having together interfitting and cooperating boss and enlarged slot configurations, a resilient snubber element is located within each slot to be abutted by the cooperating boss and is effective under one degree of distortion to transmit one level of driving torque to the cutting member and is effective under further degrees of distortion to absorb high impact loading of the cutting member without damage thereto or of the drive.

1 Claim, 4 Drawing Figures

POWERED CUTTER WITH SNUBBER DRIVE MEANS

This invention provides a snubber device in the drive of a powered cutting tool operable upon jamming of the cutting blades to minimize and/or materially reduce damage to or failure of the drive such as gear components therein, and/or of the cutting blades, and/or of the powering electric motor.

The invention will be fully understood and appreciated after reviewing the following specification, the accompanying drawing forming a part thereof, wherein.

Figure 1:
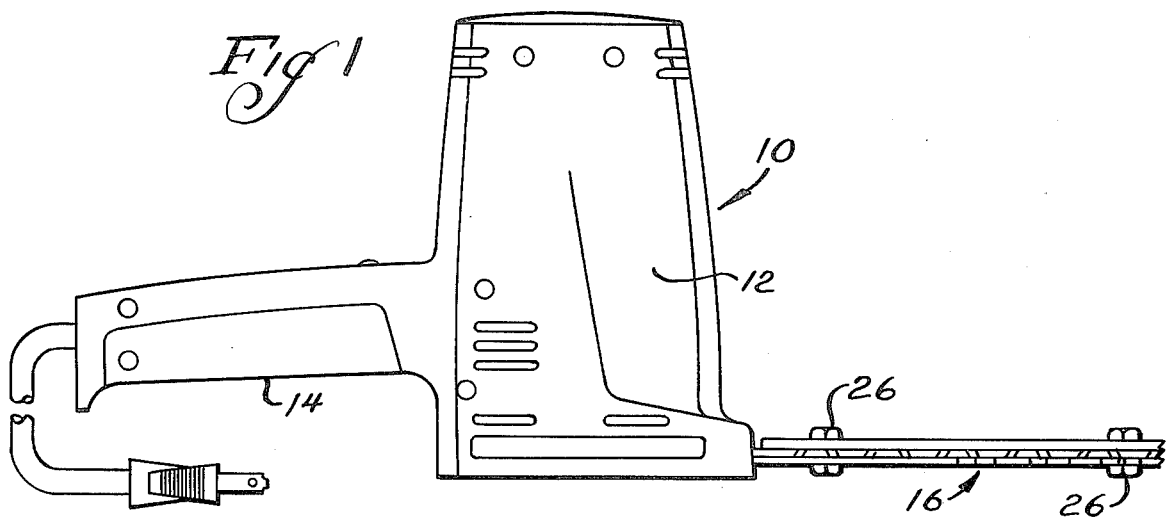
FIG. 1 is a side elevational view of an electric hedge trimmer incorporating a preferred embodiment of the subject invention.
Figure 2:
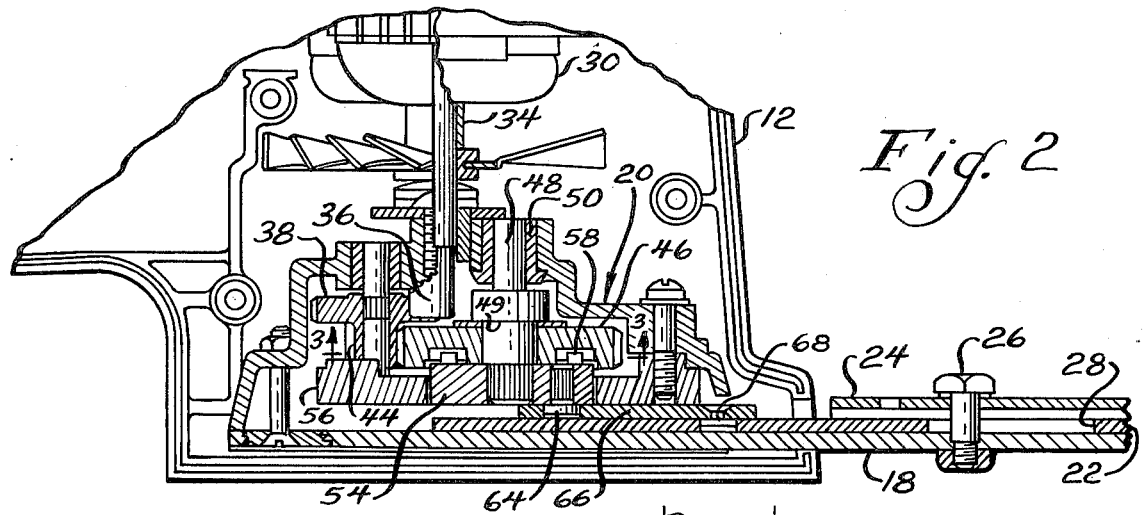
FIG. 2 is a enlarged elevational view of the same hedge trimmer shown in FIG. 1, except with the exterior case broken away, and the parts in section.
Figure 3:
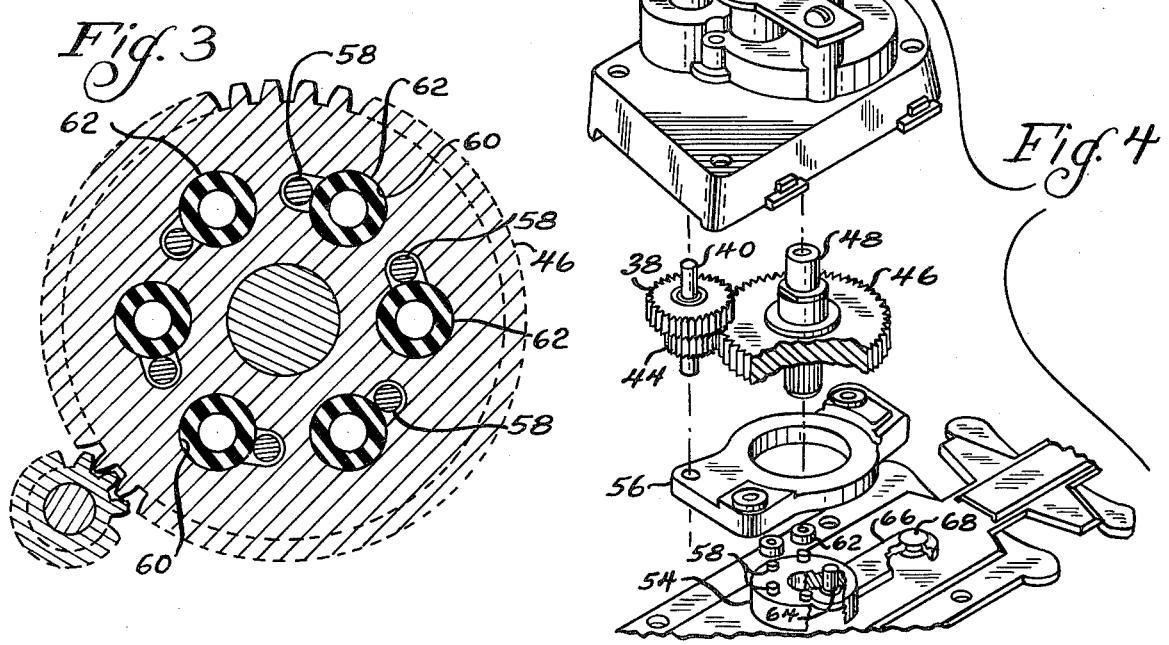
FIG. 3 is a sectional view as seen generally from line 3—3 in FIG. 2.
Figure 4:
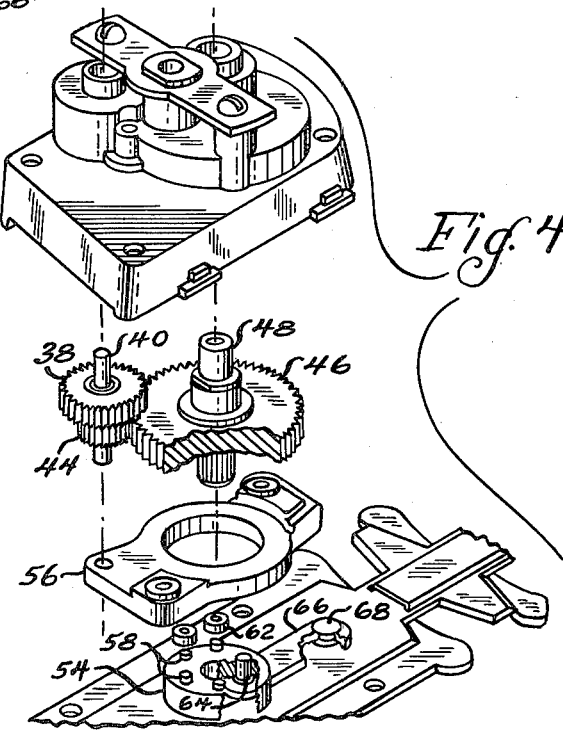
FIG. 4 is a perspective view partly broken away and/or disassembled to show some various drive components in operative association with one another.

FIGS. 1 and 2 show a hedge trimmer 10 having a case 12 with a protruding handle 14 and a cutting blade assembly 16 protruding from the case 12 in the direction opposite the handle. The cutting blade assembly 16 consists of a lower comb 18 secured relative to the case at the power transmission housing 20 and an upper cutting blade 22 secured under oiler channel 24 by spaced bolts 26 against the comb 18 and being reciprocatable relative thereto within the limits of the elongated slots 28.

An electric motor 30 is supported within the case 12 and has an output shaft 34 which extends into the power transmission housing 20. A pinion 36 on the shaft engages gear 38 keyed to the shaft 40 rotatably supported by bearings within transmission housing 20, and a second gear 44 also keyed to the shaft 40 engages gear 46 which in turn is rotatably supported on shaft 48 butted against shoulder 49, and the shaft is in turn journaled in bearing 50. An eccentric member 54 is pressed onto the shaft 48, and this holds the shaft 48, gear 46 and eccentric member 54 together as an assembly, and the eccentric member in turn is journaled within an opening in plate 56 of the transmission case 20.

The eccentric member is butted up approximately flush against the gear member 46, and has a plurality of upstanding pins of bosses 58 each of which fits loosely within a keyhole type slot 60 formed in the gear member 46. Additionally the enlarged portion of the keyhole slot receives a resilient snubber block 62 which is thereby confined between the gear member 46 and eccentric member 54. The eccentric member 54 has a pin 64 secured thereto offset from the center axis of the shaft 48 and a link 66 is socketed over the pin 64 and is likewise pivoted by pin 68 to the moving cutting blade 22.

Preferably there are approximately six such formed projecting bosses 58 and receiving slots 60 along with the compression snubber blocks 62, and each of these is adapted to be engaged and under compression at substantially the same time. When the snubbers are moderately compressed a driving torque is transmitted across the members 46 and 54 to the cutting blades and moves them through repeative cutting strokes. When a serious obstruction is encountered in the normal cutting movement of the blade 22 then additional compression of the snubber blocks 62 occur and serves to lessen any sharp impact in the drive train gears from the motor or in the teeth of the cutting blade itself. If stalling of the motor occurs the motor can then be shut off to avoid permanent damage.

The use of the disclosed snubbing device is believed to improve the operating characteristics of the cutting tool with minimal extra cost, in that potential damage to the drive train gears and/or other relatively high cost but yet low strength components allows for a much closer engineered design of the tool. Should the tool be subjected to severe over use and the cutting teeth bind, the same is easily perceived by the user so power can be shut off to the unit; and the abrupt shock is absorbed harmlessly by compression of the snubber blocks 62. The flexibility in the snubbing action is increased by having the resilient elements hollow or tubular in shape, as shown, and this configuration is preferred; although firmer snubber action is possible by reducing, to the extent of even eliminating, the bore in the resilient snubber element. The resilient element preferably fits rather snuggly in the plate recess means, thus more readily withstanding abrading damage.

I claim:

1. In a powered hedge shear having a stationary blade and a cutting blade supported to move relative to the stationary blade, and linkage means connected between a rotary power shaft and the cutting blade for powering the latter, the improvement being a snubber device in the linkage means and comprising a pair of adjacent members and means for supporting each said member for independent rotation about a common axis through the members, a plurality of boss means on one of the adjacent members located radially of the rotational axis and fitting respectively freely into a corresponding plurality of circumferentially elongated recess means in the adjacent member, a resilient snubber element in each recess means and fitting generally snuggly therein and adapted to be abutted by the boss means upon rotation in the proper direction of the adjacent members relative to one another, said snubber elements each being tubular in configuration and being located with the hollow bore extended in the same direction generally as said rotational axis and said boss means being cylindrical and extending generally in the direction of and lining up circumferentially generally with said hollow bore in the tubular snubber element, the recess means and snubber elements being sized relative to one another to limit free play of the snubber elements in the recess means upon attempted rotation of the members relative to one another, operable for transmitting a torque equal to the energy of compression of the snubber elements and further for reducing shock impact against the moving blade through the linkage means to the rotary shaft by and upon additional compression and distortion of the snubber elements.

* * * * *